US011113110B2

(12) United States Patent
Thammaiah et al.

(10) Patent No.: US 11,113,110 B2
(45) Date of Patent: Sep. 7, 2021

(54) INTELLIGENT POOLING OF ISOLATED HIERARCHICAL RUNTIMES FOR CLOUD SCALE DATABASES IN A MULTI-TENANT ENVIRONMENT

(71) Applicant: Oracle International Corporation, Redwood Shores, CA (US)

(72) Inventors: Ravi Thammaiah, Redwood City, CA (US); Santosh Shilimkar, San Jose, CA (US); Nagarajan Muthukrishnan, Foster City, CA (US); Vijayendra Lakkundi, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 243 days.

(21) Appl. No.: 16/166,035

(22) Filed: Oct. 19, 2018

(65) Prior Publication Data

US 2020/0125413 A1 Apr. 23, 2020

(51) Int. Cl.
*G06F 7/02* (2006.01)
*G06F 16/00* (2019.01)
*G06F 9/50* (2006.01)
*G06F 16/27* (2019.01)

(52) U.S. Cl.
CPC ............ *G06F 9/5027* (2013.01); *G06F 16/27* (2019.01); *G06F 9/5011* (2013.01); *G06F 9/5016* (2013.01)

(58) Field of Classification Search
CPC .... G06F 9/5027; G06F 9/5011; G06F 9/5016; G06F 16/27; G06F 16/21
See application file for complete search history.

(56) References Cited

U.S. PATENT DOCUMENTS

| 7,213,012 B2 | 5/2007 | Jakobsson |
| 7,644,730 B2 | 1/2010 | Reck |
| 8,201,180 B2 | 6/2012 | Briscoe et al. |
| 10,162,678 B1 * | 12/2018 | Stafford ............... G06F 9/5016 |
| 2003/0093408 A1 | 5/2003 | Brown et al. |
| 2003/0167255 A1 | 9/2003 | Grabhoff et al. |

(Continued)

OTHER PUBLICATIONS

Le Sommer et al., "A Contract-Based Approach of Resource-Constrained Software Deployment", 12th European Conference on Computer Vision, ECCV, dated Jan. 1, 2002, 16 pages.

(Continued)

*Primary Examiner* — Bruce M Moser
(74) *Attorney, Agent, or Firm* — Hickman Becker Bingham Ledesma LLP

(57) ABSTRACT

Techniques are described herein for intelligent pooling and management of isolated hierarchical runtimes in a multi-tenant environment. In an embodiment, an allocation of operating system resources of a container database management system (CDBMS) is allocated to each generic nest of a pool of generic nests. The allocation includes a quota of one or more processors and a quota of memory. A configuration profile for a PDB in the CDBMS is then determined. Based on the configuration profile determined for the PDB, a matching generic nest from the pool of generic nests is determined. A matching generic nest is assigned to the PDB. The matching generic nest is then configured for the PDB.

18 Claims, 7 Drawing Sheets

(56) References Cited

U.S. PATENT DOCUMENTS

| | | |
|---|---|---|
| 2006/0230035 A1 | 10/2006 | Bailey et al. |
| 2008/0052266 A1 | 2/2008 | Goldstein et al. |
| 2012/0221534 A1 | 8/2012 | Gao et al. |
| 2014/0095530 A1* | 4/2014 | Lee ..................... G06F 16/211 707/769 |
| 2016/0283274 A1* | 9/2016 | Kochunni ............. G06F 9/5022 |
| 2017/0272475 A1 | 9/2017 | Yu et al. |
| 2018/0335952 A1* | 11/2018 | Rahman ................ G06F 3/0659 |

OTHER PUBLICATIONS

Oracle® Database, "Performance Tuning Guide",11g Release 1 (11.1), B28274-02 Chapter 15-18, dated Jul. 2008, 500 pages.

* cited by examiner

INTELLIGENT POOLING OF ISOLATED HIERARCHICAL RUNTIMES FOR CLOUD SCALE DATABASES IN A MULTI-TENANT ENVIRONMENT

FIELD OF THE INVENTION

The present invention relates to resource management for pluggable databases held within a CDB. The present invention more specifically relates to a single and multi-node database management systems that allows for dynamic allocation and deallocation of operating system resources between pluggable databases while providing isolation of operating system resources for enhanced security.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.
Database Systems A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A client may issue a series of requests, such as requests for execution of queries, to a DBMS by establishing a database session. A database session comprises a particular connection established for a client to a database server through which the client may issue the series of requests. A database session executes within a database process and the database session processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be an operating system process or an operating system thread or a user defined execution context such as a user thread or fiber. Database processes may also include "database server system" processes which provide services and/or perform functions on behalf of entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. java filed) and the compiled version of the class (i.e. class file).

Multitenant Architecture

A container DBMS (CDBMS) is a powerful mechanism for database consolidation. A CDBMS provides a high degree of computer resource sharing while concurrently providing a high degree of isolation. A container DBMS is based on a "container". A container is a collection of schemas, objects, and related structures in a multitenant container database (CDB) that appears logically to an application as a separate database. Within a CDB, each container has a unique ID and name. The root database and every pluggable database (PDB) is considered a container. A CDBMS may contain numerous PDBs. PDBs isolate data and operations so that from the perspective of a user or application, each PDB appears as if it were a traditional non-CDB. Each PDB is defined by its own separate database dictionary, defining database objects within the PDB. A user may access a PDB within a CDBMS by establishing a database session for a PDB.

The CDBMS stores the system metadata required to manage all PDBs within the CDBMS. In some implementations, the root database of a CDBMS stores data that is common across the PDBs of the CDBMS, such as definitions for common users and roles, shared tables, code packages, and so forth. A PDB comprises a user-created set of schemas, objects, and related structures that appears logically to an application as a separate database. As a result, each PDB can potentially be used to store data related to a different application, such as one PDB being dedicated to hosting a human resources application and another PDB being dedicated to hosting a sales application. However, since shared database resources are stored just once in the root database and linked to by the database dictionaries of the PDBs, duplication of data is avoided compared to hosting each application with a completely separate traditional database. Furthermore, since PDBs are essentially self-contained databases in their own right, PDBs can be easily transferred between different CDBs for upgrade or load balancing purposes.

A CDB enables computer resource amortization ("resource amortization"). The computer resources required to provision and host a PDB are in effect amortized between the multiple PDBs within a CDB. The computer resources needed per PDB are thereby reduced.

In a CDBMS, database server system processes are not dedicated on a per PDB basis, but rather serve multiple PDBs within a CDB. The overhead of database server system processes is thereby amortized across the multiple PDBs in the CDB.

A CDBMS provides isolation, at least to a degree. Database sessions established for a PDB may be limited to accessing or otherwise viewing database objects defined for the PDB by the PDB's dedicated database dictionary.

A CDBMS may implement various levels of isolation. While database objects may be isolated between database sessions of PDBs, various computing resources may be shared across database sessions of PDBs. Hosting multiple PDBs on the same database server thus allows the computing resources of database servers or instances to be shared between multiple PDBs.

Resource Allocation

Using a multitenant architecture, a server within a single operating system instance is used to run multiple CDBs and PDBs. By using a single operating system instance, resources managed by the operating system may be shared, including computing resources, filesystems, and network resources. However, computing resources are finite and expensive. Pluggable databases that are allocated a certain portion of computing resources may spend time idling while allocated computing resources go unused. Techniques are desired to maximize the use of computing resources in a multitenant environment. Described herein are techniques for pooling of isolated hierarchical runtimes in a multi-tenant environment.

DETAILED DESCRIPTION

Figure 1:
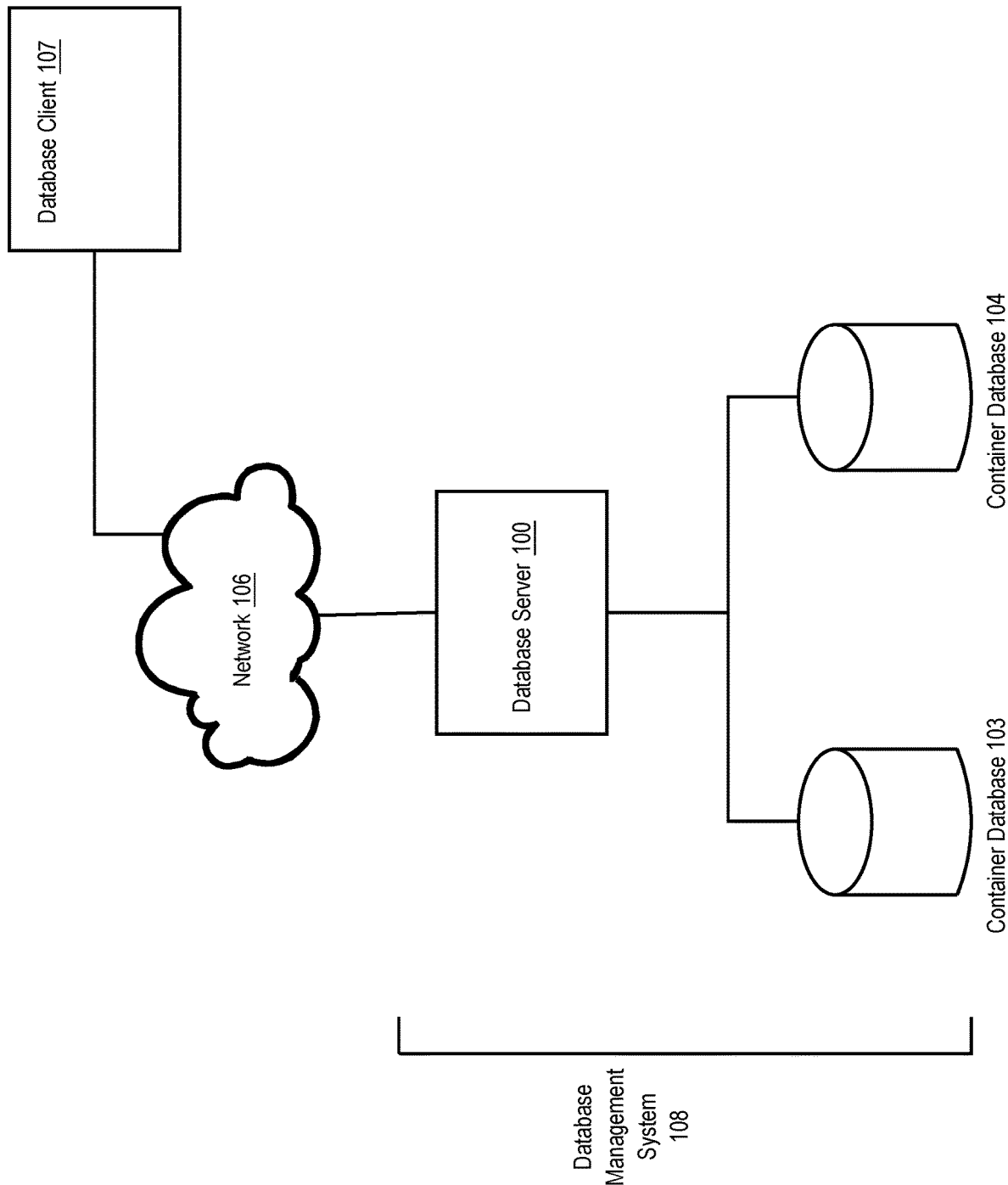
FIG. 1 illustrates an example computer-networking environment upon which an embodiment may be implemented.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are approaches for managing operating systems resources used for PDB's in CDBMS in a way that maximizes resource usage in the CDBMS. Key to these approaches are database nests.

A database nest is a set and quota of operating system computer resources to which processes of a particular PDB database may be confined. Operating system resources are computer resources that may be accessed via an operating system and/or that are managed by the operating system. Operating system resources include processes, memory, network resources, file systems, subdirectories therein, and CPUs.

A database nest is associated with a quota of operating system resources that may be assigned to a set of database processes. The set of database processes is referred to herein as running within the database nest. An operating system ensures that processes running within the database nest do not exceed the quota and constraints specified by the database nest.

Database nests enable resource pooling of operating system resources for PDB's hosted on a CDB. Specifically, operating system resources of a CDB are divided between database nests in a pool of database nests. When a PDB is active, the PDB is assigned a database nest. When not active, the PDB is in effect not assigned a database nest.

Resource pooling maximizes use of operating system resources of a CDB. The operating system resources in a pool only need to support a number of PDB's expected to be active at the same time. Thus, given that the operating system resources of a CDB can support an expected number of active PDB's, the number of PDB that can be hosted can be larger the number of expected active PDBs.

Dividing of operating system resources among PDB's hosted on a CDB can be accomplished by dividing operating system resources among database nests in a pool. Furthermore, not all PDB's have the same service level requirements and thus do not require the same level of operating system resources. By dividing different levels of operating system resources among the database nests in a pool, different levels of operating system resources can be divided among PDB's according to their specific service level requirements. When needed by a PDB, the database nest suited for the service level requirements of the PDB may assigned to the PDB.

The database nests in a pool may be generic, that is, not specific to any particular PDB. When a generic nest is assigned from a pool to a PDB, the generic nest is then referred to as a PDB nest and may be "customized" for the PDB. Such customization involves, inter alia, providing PDB isolation as described in more detail below.

Each generic nest of a pool of generic nests may be assigned a quota of operating system resources and each generic nest of a pool of generic nests may be allocated a different amount of operating system resources than other generics nest of the pool of generic nests. Before being assigned to a PDB or CDB, generic nests may isolated to a of basic set of operating system resources that are applicable to all PDBs within CDBs that the generic nest can potentially be assigned to.

Generic nests may be assigned to one or more PDBs or CDBs and then may be further configured based on a PDB configuration profile associated with a PDB. In order to maximize the utility of operating system resources, a database server may dynamically allocate and deallocate operating system resources reserved to PDB nests.

As noted previously, the embodiments of the invention are implemented within a CDBMS. A brief description of a CDBMS is therefore useful.

General Operating Environment

FIG. 1 illustrates an example computer-networking environment upon which an embodiment may be implemented. Although FIG. 1 only depicts a particular number of each element, a practical environment may have many more, perhaps hundreds or thousands, of each of the elements illustrated in FIG. 1.

In FIG. 1, database server 100 represents a combination of software and resources on one or more computing devices that are communicatively coupled to databases (CDB 103, CDB 104) and are communicatively coupled to each other via network 106 and also to database client 107. Database server 100 runs an operating system instance. An example of an operating system instance is described below in the "Software Overview". CDB 103 and CDB 104 are collectively referred to as "the CDBs". An example of a computing device upon which the database servers may be implemented is described below in the "Hardware Overview".

In an embodiment, network 106 represents one or more local networks, wide area networks, internetworks, or service provider networks. In some embodiments, network 106 represents the Internet.

In an embodiment, the database client 107 represents a combination of software and resources on one or more computing devices which implements one or more applications that send commands to the database servers in order to retrieve, modify, delete, or submit data stored by the CDBs. An example of a computing device upon which the database servers may be implemented is described below in the "Hardware Overview".

CDB

Figure 2:
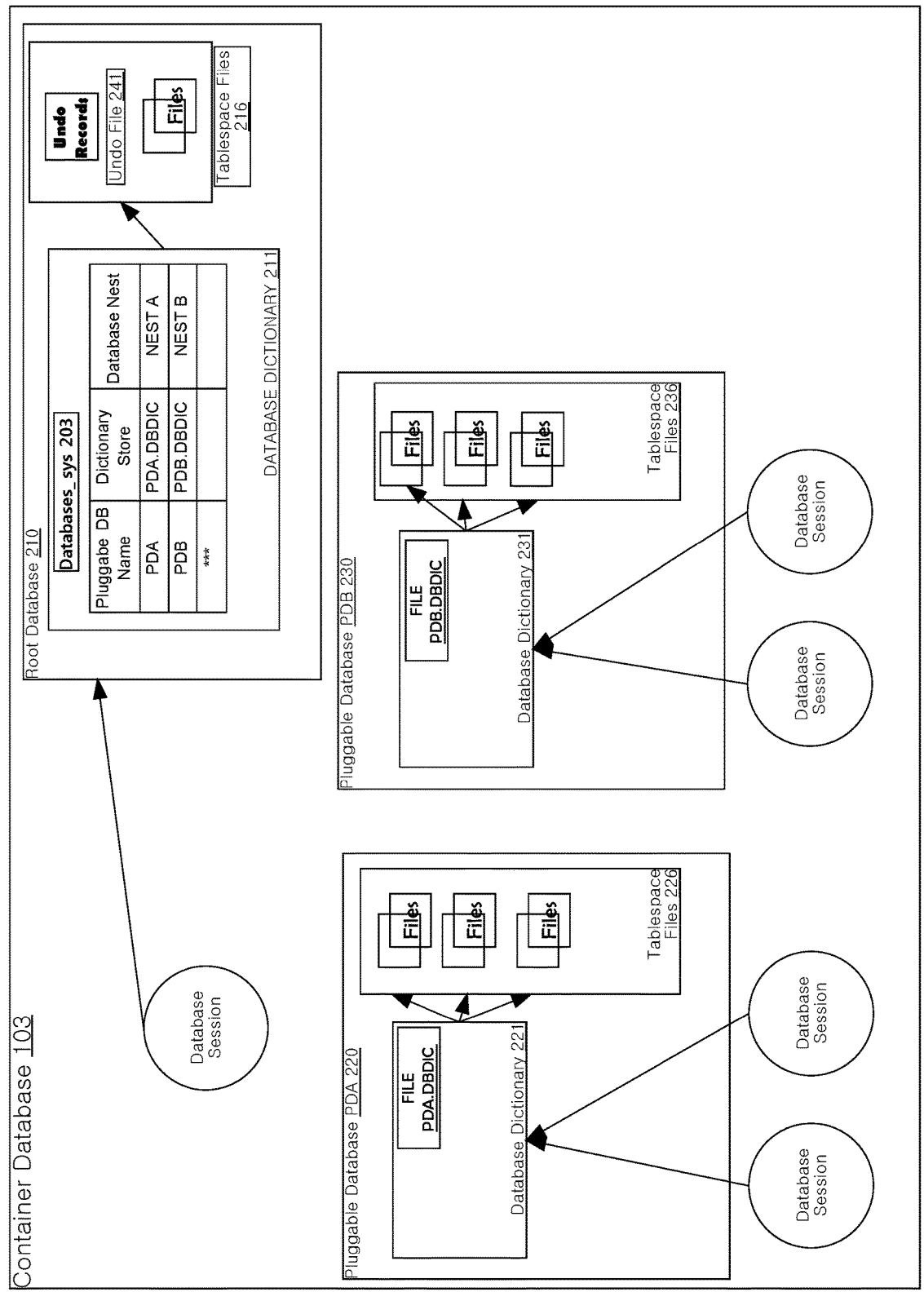
FIG. 2 is a diagram depicting a CDB according to an embodiment of the present invention.

FIG. 2 illustrates an example structure for a general CDBMS according to an embodiment. In order to illustrate clear examples, FIG. 2 is described with respect to CDB 103, but the description also applies to CDB 104 as well.

CDB 103 contains multiple databases that are hosted and managed by database server 100. The databases include pluggable database PDA 220 and pluggable database PDB 230, and root database 210, which is associated with pluggable database PDA 230 and pluggable database PDB 230, as shall be explained in greater detail below. In other embodiments, the CDB 103 may contain more pluggable databases than the number of pluggable databases that are depicted in FIG. 2.

Pluggable database PDA 220 includes database dictionary 221. Data for database objects of pluggable database PDA 220 is stored in tablespace files 226.

Pluggable database PDB 230 includes database dictionary 231. Tablespace Files 236 store data for database objects of pluggable database PDB 230.

The database server 100 responsible for the CDB 103 may establish database sessions for the root database 210 or any of the member pluggable databases. The database dictionary of the PDB for which the database session is established determines the scope of the commands issued by database client 107 (e.g., which database(s) the command will be executed on), which permissions are checked, which database dictionaries will be used for the session, and so forth. A database session established for PDB may be referred to herein as running within the PDB. A database session established for the root database is referred to herein as running with the CDB, or CDBMS of the CDB.

Root Database

Root database 210 is a database used by database server 100 to globally manage the CDB 103. An important function facilitated by root database 210 is to define pluggable databases within the CDB 103. Similar to pluggable databases, the root database 210 includes a database dictionary 211. The database dictionary of a root database may be referred to herein as a root database dictionary. Database dictionary 211 contains metadata that defines various aspects of the CDB 103 needed to administer CDB 103 and the pluggable databases contained therein. Data for database objects defined by database dictionary 211 is stored in tablespace files 216.

Database dictionary 211 defines pluggable databases within the CDB 103 aspects or properties of a pluggable database. The attribute Pluggable DB is a name or label for a pluggable database.

Records in database dictionary 211 define pluggable databases and which database nest each pluggable database is assigned to. For example, one record in database dictionary 211 defines pluggable database PDA 220 and its database nest NEST A. Another record in database dictionary 211 defines pluggable database PDB 230 and its database nest NEST B. Pluggable database and corresponding database nest assignments may also be stored in a dictionary store file such as PDA.DBIDC and PDB.DBIDC. Database dictionary 221, 231 may also define which database nest each pluggable database is assigned to. In an embodiment, two or more pluggable databased may be assigned to a single database nest.

Pluggable Database Session

A user may access a PDB in CDB 103 by submitting a connection request that identifies the PDB. In response to receiving the request, database server 100 establishes a database session for the PDB. Establishing the database session for the PDB entails establishing the database dictionary of the PDB as the database dictionary for the database session. Once the PDB dictionary is established as a database dictionary of the PDB, access is isolated to the database objects of the PDB, and to common database objects of the root database, as shall be described in further detail. Establishing the PDB dictionary as a database dictionary for a database session may be referred to herein as attaching the database dictionary to the database session.

With respect to the PDB objects in the one or more PDBs of a CDB, execution of database commands issued to a database session attached to a PDB dictionary can only access PDB objects that are defined by the PDB dictionary. Consequently, access by users of the database session may be restricted to accessing PDB objects that are defined by the attached PDB dictionary, thereby isolating database access to PDB objects to those in the respective PDB. This isolation not only applies to end users but may also to administrators of a PDB.

For example, in response to a connection request for access to Pluggable Database PDA 220, Database Dictionary 221 is attached to the database session. Database commands issued in the database session are executed against Database Dictionary 221. Access to pluggable database objects through Data Manipulation Language (DML) commands issued in the database session is isolated to pluggable database objects defined by Database Dictionary 221. Isolation by concurrently executing database sessions with Pluggable Database PDA or Pluggable Database B is achieved in the same manner.

Namespaces

Each database nest may be isolated to its own set of processes, files, memory, and system call limitations. Database sessions of a PDB running within database nest do not have access to processes and resources in another database nest of another PDB.

According to an embodiment, database nests are implemented through the use of operating system namespaces. Operating systems such as Linux support isolation features such as namespaces. Namespaces are a feature that a number of operating systems, such as Linux, support to isolate the running of a number of processes from other processes running within the same computer system. Operating system kernels such as Linux provide the ability to programmatically create different types of "namespaces" such as "process identification" namespaces and "network" namespaces. Upon creation of a "process identification" or "PID" namespace, for example, processes that belong to the namespace can only see other processes that have been created in the same namespace. Other operating systems also support isolation features such as namespaces. Additional non-limiting examples of operating systems that include network isolation features such as namespaces are Solaris Zones and Windows Server Containers.

Similarly, upon creation of a "network" namespace, processes that belong to the namespace can only see network sockets, bound ports, interfaces, routing table, etc. that are defined for the namespace. Creating a namespace in effect creates a network stack. Processes within a network namespace are limited to their own set of network sockets, bound ports, interfaces, routing table, etc. that are defined for the namespace.

Network namespaces partition the use of the network—devices, addresses, ports, routes, firewall rules, etc.—into separate logical boxes, essentially virtualizing the network within a single running kernel instance. Each network namespace has its own network devices, IP addresses, TCP/UDP ports, and routing tables. Each network namespace may be configured with unique routing tables and/or firewall rules. Each network namespace provides a copy of the network stack, as described herein.

Other processes outside of the network namespace cannot access these network resources and do not even the network they exist. Furthermore, a process assigned a namespace cannot monitor or view traffic related to another network namespace.

Operating systems such as Linux provide several other kinds of namespaces. For example, the mount namespace isolates a process from a mounted filesystem. The mount namespace is the set of mount filesystems that a process can access. The set may be different from a process running natively on the host or a process running in another namespace, which may have its own mounted filesystem set. A process within a mount namespace can change its set of mount filesystems without affecting processes running outside of the namespace.

The UTS namespace allows a single system to appear to have different host and domain names to different processes. The UTS namespace isolates the hostname and the Network Information Service (NIS) domain name. The hostname in a namespace can be changed without affecting the hostname of the host itself. The UTS namespace may be used to isolate hostnames.

The IPC namespace isolates certain inter-process communication resources such as the Portable Operating System Interface (POSIX) message queues and System V Interprocess Communication (IPC) mechanisms. IPC namespaces isolate processes from System V style inter-process communication. This prevents processes in different IPC namespaces from using, for example, the shared memory (SHM) family of functions to establish a range of shared memory between the two processes. Instead, each process can use the same identifiers for a shared memory region and produce two such distinct regions.

The PID namespace isolates the process ID number space, meaning that processes in different PID namespaces can have the same PID. With PID namespaces, a single process can have multiple PIDs associated with it, one for each namespace it falls under. PID namespaces are nested, meaning when a new process is created it will have a PID for each namespace from its current namespace up to the initial PID namespace. Hence, the initial PID namespace is able to see all processes, albeit with different PIDs than other namespaces will see processes with. PID namespaces allow containers to provide functionality such as suspending/resuming the set of processes in the container and migrating the container to a new host while the processes inside the container maintain the same PIDs.

A user namespace isolates user IDs and group IDs between a host and containers. The user namespace allows a process to have root privileges within a namespace, without giving it that access to processes outside of the namespace. Additionally, a user namespace provides both privilege isolation and user identification segregation across multiple sets of processes. Like the PID namespace, user namespaces are nested, and each new user namespace is considered to be a child of the user namespace that created it. A user namespace contains a mapping table that converts user IDs from a container's point of view to the system's point of view. This allows, for example, the root user to have user id 0 in the container but is actually treated as user id 1,800,000 by the system for ownership checks.

Database Nest Isolation

A database nest may provide file system isolation such as restricting which file system(s) that processes associated with PDBs can access. For example, a database nest may be assigned its own mount namespace which restricts the mounted filesystems that a process running in the database nest can access.

A database nest may provide interprocess communication isolation such as isolating resources such as POSIX message queues and System V IPC mechanisms between processes.

A database nest may provide memory isolation such as restricting which segments of memory that a process running in a database nest can access.

A database nest may also provide system restrictions for executing system calls. For example, a database nest may prevent certain system calls from being executed and may also allow only certain system calls to execute.

Figure 3:
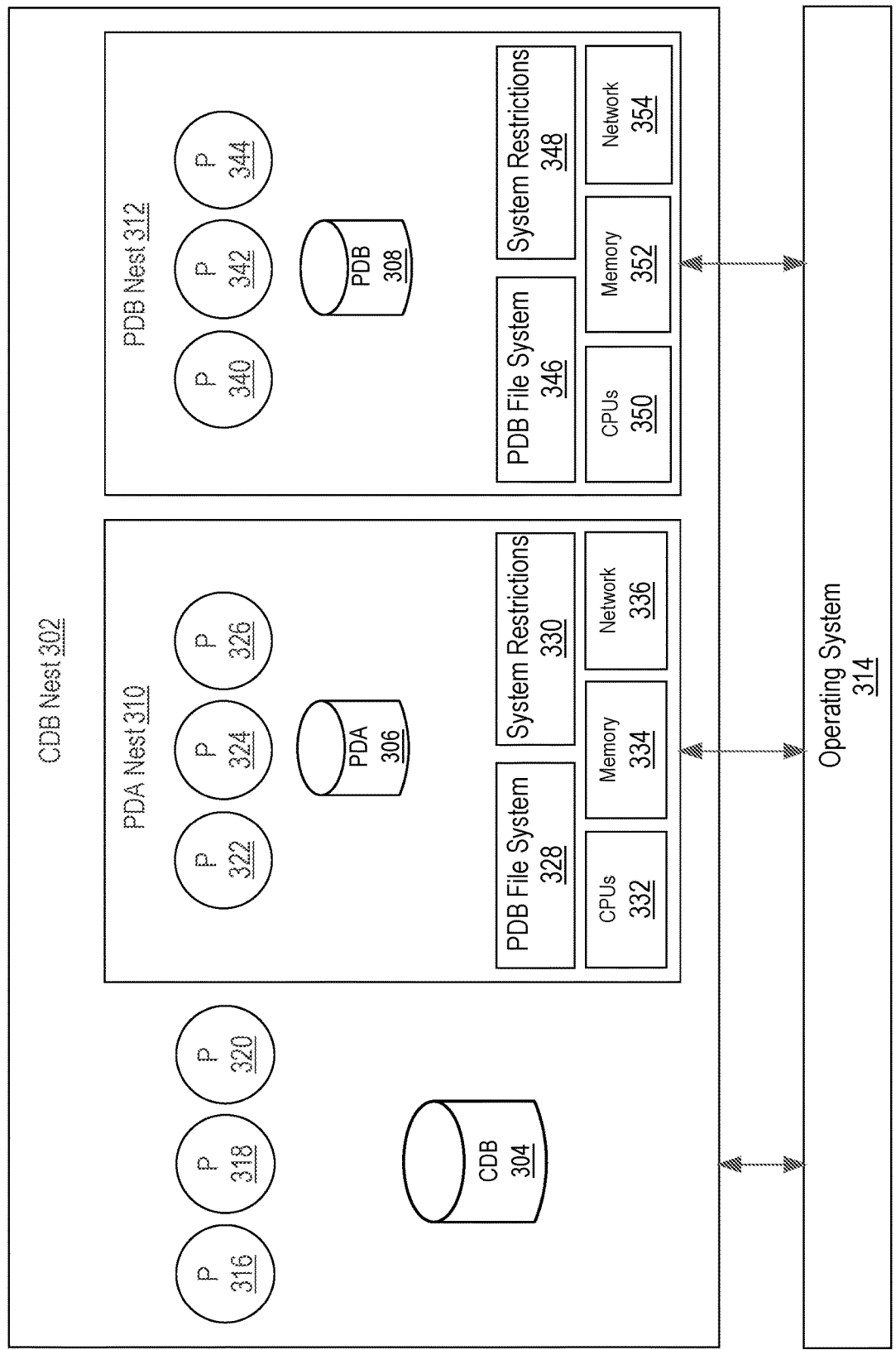
FIG. 3 illustrates an example structure of a database nest execution model according to an embodiment of the present invention.

FIG. 3 illustrates an example structure of a database nest execution model, according to an embodiment. In order to illustrate clear examples, FIG. 3 is described with respect to CDB 304.

CDB nest 302 contains multiple databases that are hosted and managed by database server 100. The databases include CDB 304, pluggable database PDA 306 and pluggable database PDB 308. In other embodiments, the CDB 304 may contain more pluggable databases than the number of pluggable databases that are depicted in FIG. 3. However, due to inherent hardware limitations, some implementations may set an upper limit on the number of pluggable databases that the CDB 304 can support.

Each database CDB 304, PDA 306, PDB 308 is contained by one or more database nests. For example, CDB 304 is contained by CDB nest 302, pluggable database PDA 306 is contained by PDA nest 310, and pluggable database PDB 308 is contained by PDB nest 312.

In each database nest CDB nest 302, PDA nest 310, PDB nest 312, system resources are confined and isolated using various namespaces from the operating system 314. For example, CDB nest 302 confines database processes 316, 318, 320 to exclusive access by CDB 304. PDA nest 310 confines database processes 322, 324, 326, PDB file system 328, system restrictions 330, CPUs 332, memory 334, and network 336 to exclusive access by pluggable database PDA 306 and any database associated with parent nest CDB Nest 302 such as CDB 304. Similarly, PDB nest confines database processes 340, 342, 344, PDB file system 346, system restrictions 348, CPUs 350, memory 352, and network 354 to exclusive access by pluggable database PDB 308 and any database associated with parent nest CDB Nest 302 such as CDB 304.

Generic Database Nests

Operating system resources such as memory and CPUs exist in a container database management system (CDBMS). The operating system resources may be allocated to a pool of generic database nests. In an embodiment, operating system resources may include processes, memory, network resources, file systems, subdirectories therein, and CPUs.

Generic nests have features described above for database nests. A pool of generic database nests, hereinafter 'generic nests', may be created by a system administrator, a database process, or instantiated upon creation of a container database management system. A database server distributes operating system resources between each generic nest of a pool of generic nests. Each generic nest of a pool of generic nests is assigned a quota of operating system resources. For example, each generic nest of a pool of generic nests may be assigned one or more CPUs and memory segments. Quotas can be implemented using operating system features such as Cgroups in Linux, which can be used to limit how much of each operating system resource can be allocated and used by a generic nest. Each generic nest of a pool of generic nests may be allocated a different amount of operating system resources each other generic nest of the pool of generic nests.

Generic nests may be assigned to one or more PDBs or CDBs. Once assigned, the generic nest is referred to as a PDB nest and may then be further configured based on configuration profiles associated with a PDB or CDB, as describe herein. Before being assigned to a PDB or CDB, generic nests may be isolated to basic system resources that are applicable to all PDBs or CDBs that the generic nest can potentially be assigned to. For example, a generic nest that is not yet assigned to a PDB or CDB may include isolation features that restrict processes confined by the generic nest from accessing certain system directories that are restricted to all database nests.

Quotas and allocations of operating system resources to generic nests may be assigned based on system usage metrics and statistics produced by the CDBMS. For example, if the CDBMS monitors that 50% of PDBs managed by the CDBMS require 16 CPUs and the other 50% of PDBs managed by the CDBMS require 8 CPUs, the CDBMS may set the quota for each generic nest of the pool of generic nests to be split evenly throughout the pool of generic nests so that 50% of the generic nests have a quota of 16 CPUs while the other 50% of the generic nests have a quota of 8 CPUs.

According to an embodiment, attributes, properties, and namespaces associated with generic nest properties are captured as a nest configuration profile which is stored within the generic nest infrastructure. The nest configuration profile may specify properties and attributes such as what operating system resources are currently allocated or have been allocated to a generic nest. The nest configuration profile is a feature of database nests and stays with the generic nest when a generic nest is attached to a PDB and converted into a PDB nest. A default profile is applied when the generic nest is established. Database administrators can customize this profile through database parameters and configuration files.

Figure 4:
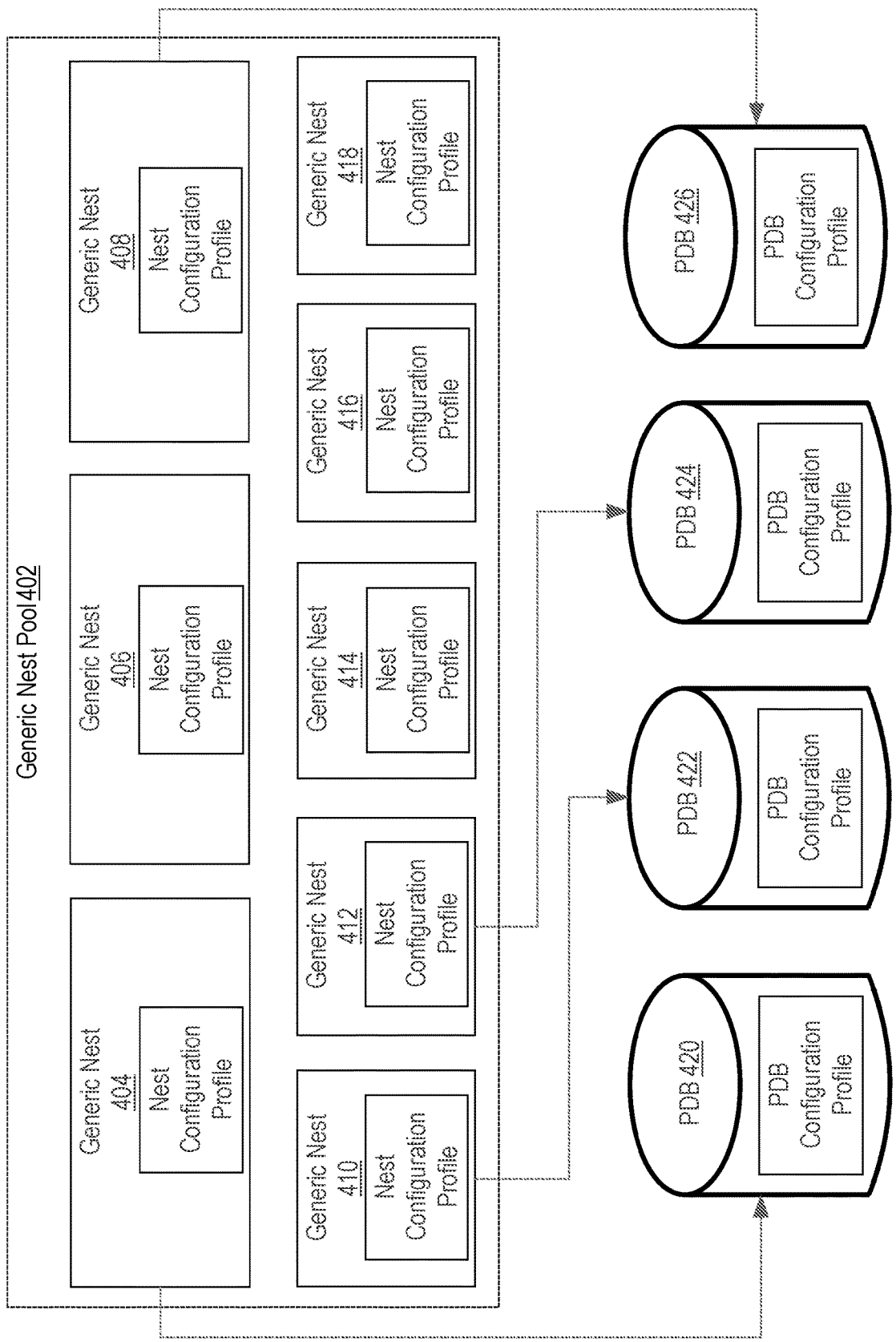
FIG. 4 illustrates an example pool of generic nests and PDBs with configuration profiles.

FIG. 4 illustrates a pool of generic nests and PDBs with configuration profiles. Generic nest pool 402 includes a plurality of generic nests 404, 406, 408, 410, 412, 414, 416, 418. Each generic nest from generic nest pool 402 may include a nest configuration profile, as discussed above. Each generic nest from generic nest pool 402 may be allocated a different amount of operating system resources than other generic nests of the generic nest pool. For example, generic nest 404 may be allocated 24 CPUs and generic nest 410 may be allocated 8 CPUs. Additionally, generic nest 406 may be allocated 24 CPUs and generic nest 408 may be allocated 20 CPUs.

PDB Configuration Profiles

According to an embodiment, operating system resources associated with a PDB are captured as a PDB configuration profile which is stored in association with the PDB. A default profile is applied when a PDB is first established. Database administrators can customize this profile through database parameters and configuration files or the profile can be created over time by the CDMBS monitoring the characteristics of the PDB. In an embodiment, the database dictionary may store each PDB configuration profile and a mapping to the respective PDB. In an embodiment, PDB a configuration profile includes information regarding CPU, memory, process usage, and isolation characteristics of a PDB.

For example, FIG. 4 illustrates a plurality of PDBs with corresponding PDB configuration profiles. Each PDB 420, 422, 424, 426 is associated with a PDB configuration profile. The PDB configuration profile of each PDB 420, 422, 424, 426 may specify attributes and properties of each respective PDB. For example, the PDB configuration profile for PDB 420 may specify that PDB 420 utilizes 24 CPUs and the PDB configuration profile for PDB 422 may specify that PDB 422 utilizes 8 CPUs.

Assigning and Configuring Generic Nests

Before a user can establish a session with a PDB, the PDB must be opened. A user may request to open the PDB. Alternatively, a user may request a database session and if the PDB is not open, the request is received as a request to open the PDB.

Once the PDB is opened, a database server establishes a database session for the PDB. Establishing the database session for the PDB entails establishing the database dictionary of the PDB as the database dictionary for the database session and assigning a database nest to the PDB.

To assign a database nest to the PDB, the database dictionary for the PDB is scanned to determine which database nest is assigned to the PDB. If it is determined that the database dictionary has a database nest assigned to the PDB, the database nest that maps to the PDB is established as the database nest for the database session.

If it is determined that the database dictionary does not have a database nest mapped to the PDB or if it is determined that the database dictionary maps the generic nest pool to the PDB, the database server determines a matching generic nest from the generic nest pool.

In order to determine a match, the database server compares the configuration profile of the PDB to a nest configuration profile of each generic nest in the pool of generic nests. The generic nest that most closely matches the PDB configuration is selected as the matching generic nest. For example, if the PDB configuration profile of a PDB specifies 16 CPUs and the nest configuration profile of a particular generic nest specifies 14 CPUs and is the closest match out of the remainder of the generic nest pool, the particular generic nest is selected as the matching generic nest.

Once a matching generic nest is selected for a PDB, the matching generic nest is assigned to the PDB and configured based on the PDB configuration profile of the PDB. For example, if the PDB configuration profile of the PDB specifies characteristics that require various namespace isolation features such as system calls, CPU, and network isolation, these features may be added to the PDB nest at runtime. Additionally, if the PDB configuration profile of the PDB specifies an allocation of operating system resources that are not accurately matched by the nest configuration profile, operating system resources such as CPUs and memory may be allocated to the generic nest to accurately match the PDB configuration profile of the PDB. For example, if a generic nest selected allocates 14 CPUs and a PDB configuration profile of a PDB specifies 16 CPUs, 2 CPUs may be additionally allocated at runtime to the PDB nest.

FIG. 4 illustrates a generic nest pool and a plurality of PDBs. The generic nests 404, 406, 408, 410, 412, 414, 416, 418 from the generic nest pool 402 are available to be assigned to PDBs 420, 422, 424, 426. As discussed above, when a database server establishes a database session for the PDB, the database server determines a matching generic nest from the generic nest pool 402. The PDB configuration profile associated with a PDB 420, 422, 424, 426 is matched to a nest configuration profile associated with a generic nest 404, 406, 408, 410, 412, 414, 416, 418. For example, if the PDB configuration profile associated with PDB 420 specifies that PDB 420 requires 24 CPUs and the nest configuration profile associated with generic nest 404 specifies that 24 CPUs are allocated to generic nest 404, a match is determined between generic nest 404 and PDB 420. In another example, if the PDB configuration profile associated with PDB 420 specifies that PDB 420 requires 24 CPUs and the nest configuration profile associated with generic nest 404 specifies that 20 CPUs are allocated to generic nest 404, generic nest 404 may be assigned to PDB 420 after determining that generic nest 404 is the best or closest match to PDB 420. After generic nest 404 is assigned to PDB 420, generic nest 404 may be allocated 4 more CPUs during runtime to meet the 24 CPU requirements of the PDB configuration profile of PDB 420.

Reclaiming Idle PDB Nests

A database server may detect that a PDB is idle and the database nest or generic nest assigned to the PDB may be stripped of their allocated operating system resources. Detecting that a PDB is idle may comprise a database server identifying that no database session of the PDB is active for a threshold amount of time. If the database server detects that a PDB is idle, the PDB nest assigned to the PDB may be stripped (quota reduced) of the allocated operating system resources. The stripped operating system resources may then be reallocated by the PDB nest to a generic nest and adding the generic nest to a generic nest pool, or creating a new generic nest in a background process and adding the new generic nest to the generic nest pool.

Example Procedure

Figure 5:
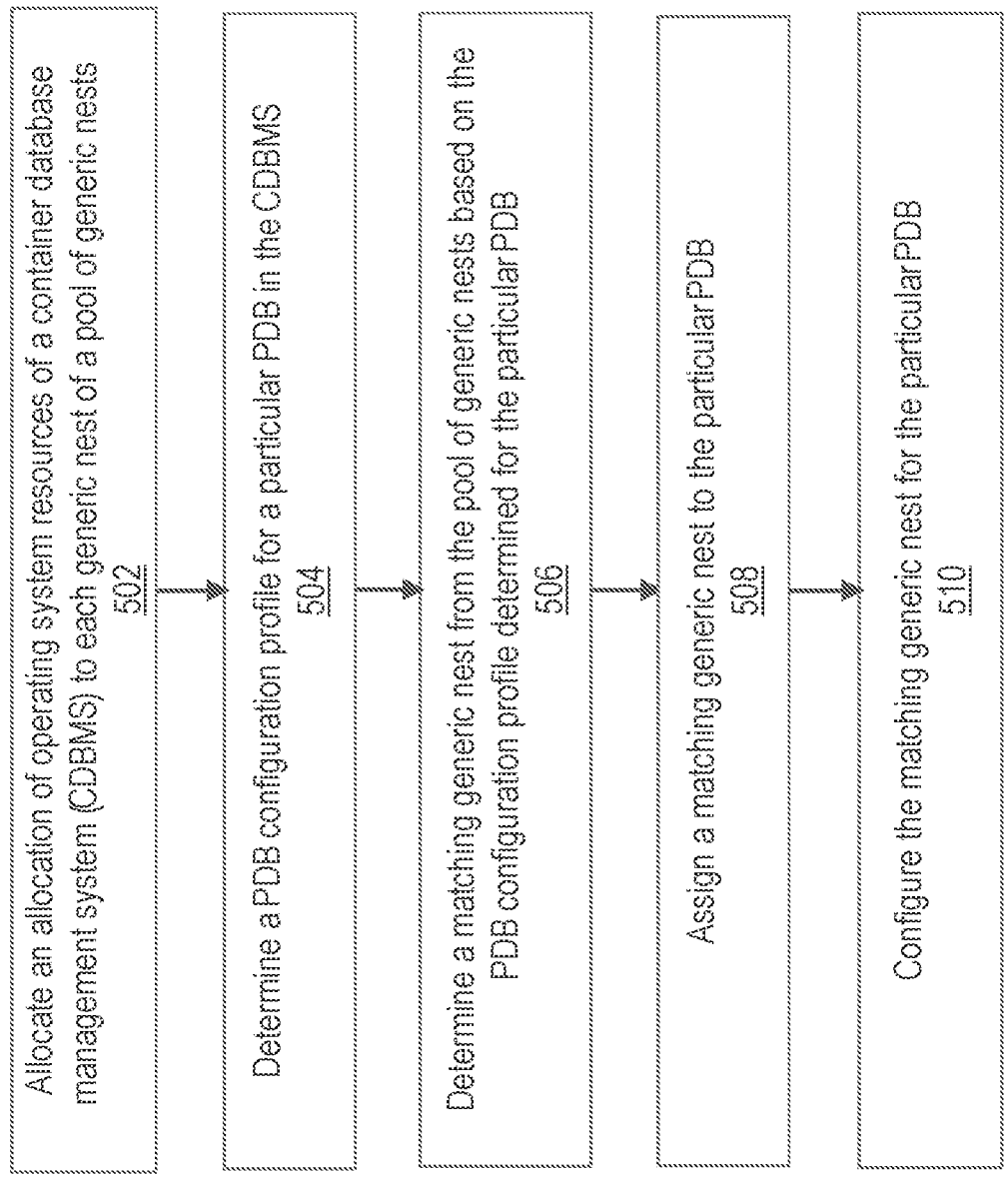
FIG. 5 depicts an example procedure for intelligent pooling of isolated hierarchical runtimes in a multi-tenant environment.

FIG. 5 illustrates an example procedure for intelligent pooling of isolated hierarchical runtimes in a multi-tenant environment. For purposes of illustration, the procedure flow depicted in FIG. 5 is discussed using DBMS 108.

At step 502, an allocation of operating system resources of a CDBMS is allocated to each generic nest of a pool of generic nests. The allocation includes a quota of one or more processors, and a quota of memory. For a particular generic nest of the pool of generic nests, an amount of operating system resources in the allocation of operating system resources allocated to the particular generic nest differs from an amount of operating system resources in the allocation of operating system resources allocated to at least one other generic nest in the pool of generic nests.

At step 504, a PDB configuration profile is determined for a particular PDB in the CDBMS.

At step 506, a matching generic nest from the pool of generic nests is determined based on the PDB configuration profile determined for the particular PDB.

At step 508, a matching generic nest is assigned to the particular PDB.

At step 510, the matching generic nest is configured for the particular PDB.

Software Overview

Figure 6:
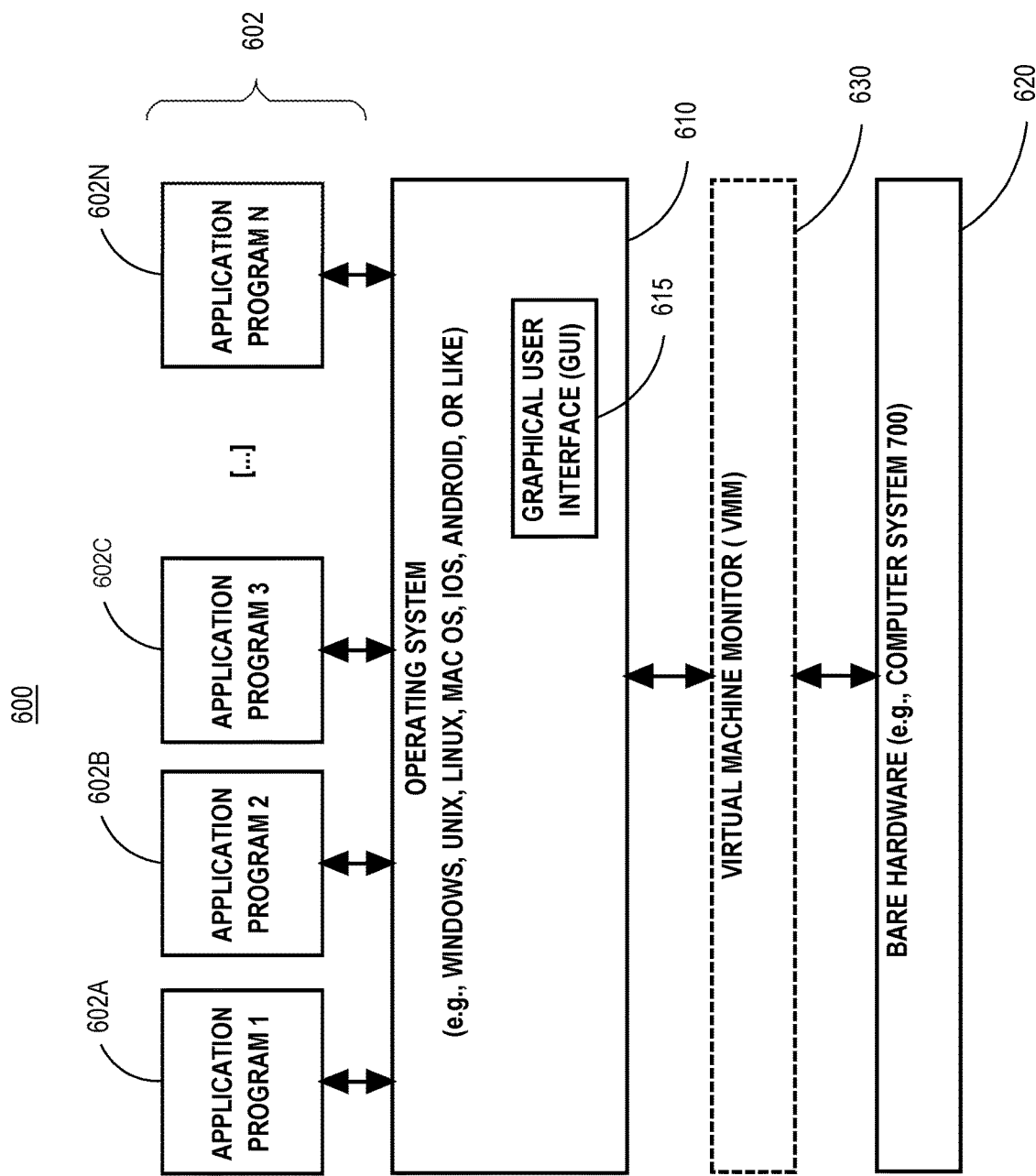
FIG. 6 is a diagram depicting a software system upon which an embodiment of the invention may be implemented.
Figure 7:
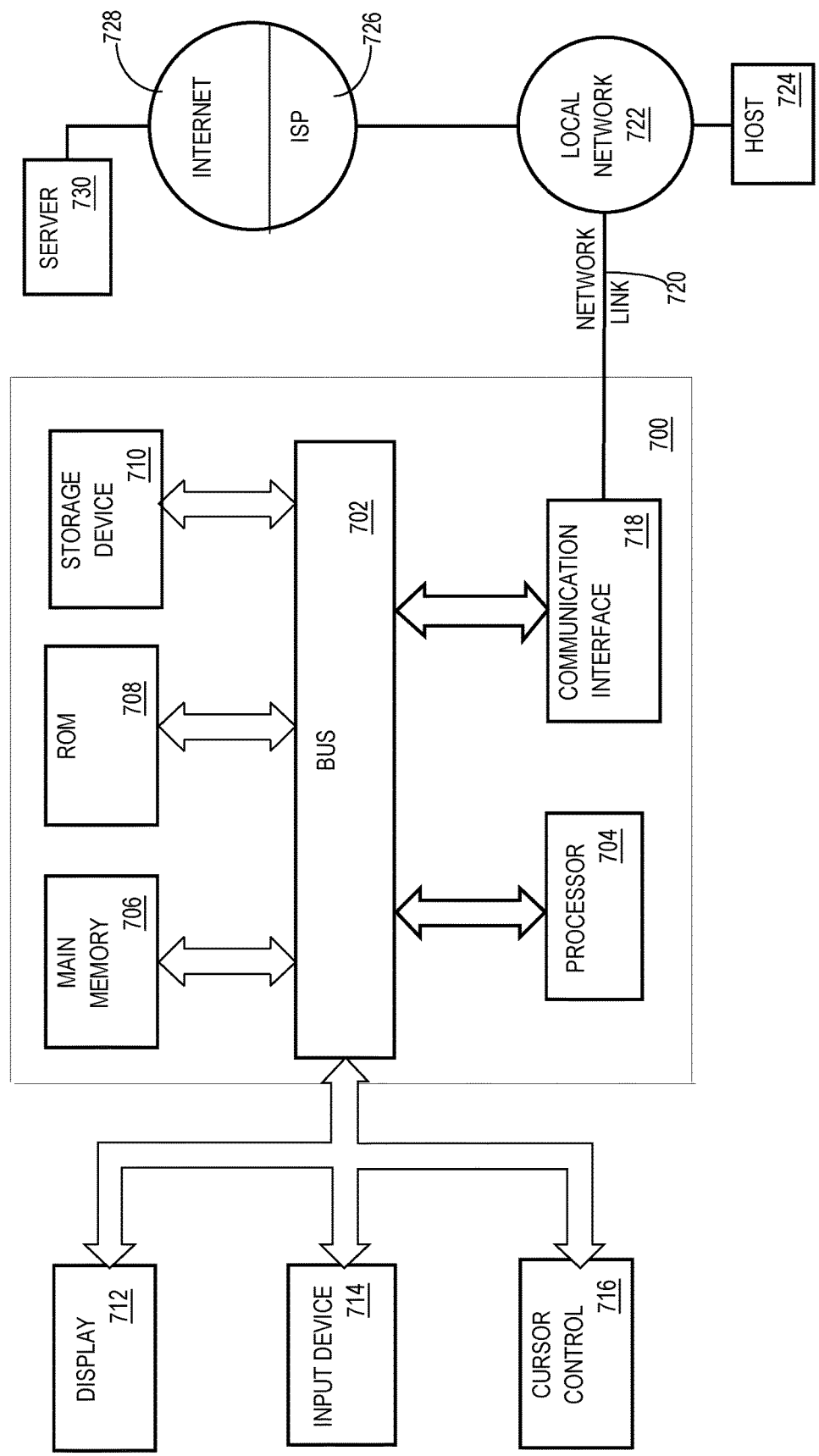
FIG. 7 is a diagram depicting a computer system that may be used in an embodiment of the present invention.

FIG. 6 is a block diagram of a basic software system 600 that may be employed for controlling the operation of computing system 700 of FIG. 7. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 700. Software system 600, which may be stored in system memory (RAM) 706 and on fixed storage (e.g., hard disk or flash memory) 710, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 710 into memory 706) for execution by the system 600. The applications or other software intended for use on computer system 700 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 704) of computer system 700. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 700.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 700 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   allocating an allocation of operating system resources of a container database management system (CDBMS) to each generic nest of a pool of generic nests, said allocation including a quota of one or more processors, and a quota of memory;
   wherein for a particular generic nest of said pool, an amount of operating system resources in the allocation of operating system resources allocated to said particular generic nest differs from an amount of operating system resources in the allocation of operating system resources allocated to at least one other generic nest in said pool;
   after said allocating, establishing a database session for a particular PDB in the CDBMS, wherein establishing the database session for the particular PDB includes:
   determining a PDB configuration profile for the particular PDB, wherein the PDB configuration profile includes information regarding CPU usage, memory usage, and isolation characteristics of the particular PDB;
   based on the PDB configuration profile determined for the particular PDB, determining a matching generic nest from said pool;
   assigning said matching generic nest to said particular PDB; and
   configuring the matching generic nest for said particular PDB, thereby converting the matching generic nest to a PDB nest;
   limiting how much operating system resources may be used by said database session to the respective allocation of operating system resources allocated to said PDB nest.

2. The method of claim 1, wherein said allocation includes a quota of network resources, a quota of storage, and a set of system calls.

3. The method of claim 1, wherein each generic nest from said pool is associated with a nest configuration profile;
   wherein determining said matching generic nest from said pool includes determining a closest match between the PDB configuration profile for the particular PDB and a nest configuration file associated with a generic nest from said pool of generic nests.

4. The method of claim 1, wherein each generic nest of the pool of generic nests is isolated to a set of operating system resources.

5. The method of claim 4, wherein configuring the matching generic nest for said particular PDB includes modifying the set of operating system resources to which the matching generic nest is isolated.

6. The method of claim 1, wherein the matching generic nest is configured based on the PDB configuration profile of the particular PDB.

7. The method of claim 1, further comprising:
   detecting that the particular PDB is idle;
   deallocating the allocation of operating system resources allocated to said PDB nest that is assigned to the particular PDB.

8. The method of claim 7, further comprising:
   based on the deallocating, generating a new generic nest and adding the new generic nest to the pool of generic nests;
   allocating an allocation of operating system resources to the new generic nest of the pool of generic nests.

9. The method of claim 7, wherein detecting that the particular PDB is idle includes identifying that a database session for the particular PDB has been inactive for a threshold amount of time.

10. One or more non-transitory computer-readable media storing sequences of instructions which, when executed by one or more processors, cause:
    allocating an allocation of operating system resources of a container database management system (CDBMS) to each generic nest of a pool of generic nests, said allocation including a quota of one or more processors, and a quota of memory;
    wherein for a particular generic nest of said pool, an amount of operating system resources in the allocation of operating system resources allocated to said particular generic nest differs from an amount of operating system resources in the allocation of operating system resources allocated to at least one other generic nest in said pool;
    after said allocating, establishing a database session for a particular PDB in the CDBMS, wherein establishing the database session for the particular PDB includes:
    determining a PDB configuration profile for the particular PDB, wherein the PDB configuration profile includes information regarding CPU usage, memory usage, and isolation characteristics of the particular PDB;

based on the PDB configuration profile determined for the particular PDB, determining a matching generic nest from said pool;

assigning said matching generic nest to said particular PDB; and configuring the matching generic nest for said particular PDB, thereby converting the matching generic nest to a PDB nest;

limiting how much operating system resources may be used by said database session to the respective allocation of operating system resources allocated to said PDB nest.

11. The one or more non-transitory computer-readable media of claim 10, wherein said allocation includes a quota of network resources, a quota of storage, and a set of system calls.

12. The one or more non-transitory computer-readable media of claim 10, wherein each generic nest from said pool is associated with a nest configuration profile;

wherein determining said matching generic nest from said pool includes determining a closest match between the PDB configuration profile for the particular PDB and a nest configuration file associated with a generic nest from said pool of generic nests.

13. The one or more non-transitory computer-readable media of claim 10, wherein each generic nest of the pool of generic nests is isolated to a set of operating system resources.

14. The one or more non-transitory computer-readable media of claim 13, wherein configuring the matching generic nest for said particular PDB includes modifying the set of operating system resources to which the matching generic nest is isolated.

15. The one or more non-transitory computer-readable media of claim 10, wherein the matching generic nest is configured based on the PDB configuration profile of the particular PDB.

16. The one or more non-transitory computer-readable media of claim 10, the sequences of instructions including instructions that, which when executed by the one or more processors, cause:

detecting that the particular PDB is idle;

deallocating the allocation of operating system resources allocated to said PDB nest that is assigned to the particular PDB.

17. The one or more non-transitory computer-readable media of claim 16, the sequences of instructions including instructions that, which when executed by the one or more processors, cause:

based on the deallocating, generating a new generic nest and adding the new generic nest to the pool of generic nests;

allocating an allocation of operating system resources to the new generic nest of the pool of generic nests.

18. The one or more non-transitory computer-readable media of claim 16, wherein detecting that the particular PDB is idle includes identifying that a database session for the particular PDB has been inactive for a threshold amount of time.

* * * * *